United States Patent
Yamada (12) 
(10) Patent No.: US 6,185,103 B1
(45) Date of Patent: Feb. 6, 2001

(54) RELEASABLE DISK DRIVE FOR ELECTRONIC DEVICES

(75) Inventor: Kevin Seichi Yamada, Sunnyvale, CA (US)

(73) Assignee: Fujitsu Limited (JP)

(*) Notice: Under 35 U.S.C. 154(b), the term of this patent shall be extended for 0 days.

(21) Appl. No.: 09/145,920

(22) Filed: Sep. 3, 1998

(51) Int. Cl.[7] .................................................... H05K 7/16
(52) U.S. Cl. ...................... 361/727; 361/724; 312/223.1; 312/223.2; 292/302; 292/300
(58) Field of Search ........................ 292/341.15, 302, 292/340, 300, 124, 27; 361/685, 724, 727; 312/223.1, 223.2

(56) References Cited

U.S. PATENT DOCUMENTS

| | | | |
|---|---|---|---|
| 4,828,299 | * 5/1989 | Poe | 292/139 |
| 5,229,919 | * 7/1993 | Chen | 364/391 |
| 5,359,492 | * 10/1994 | Porter | 361/683 |
| 5,764,477 | * 6/1998 | Ohgami et al. | 361/683 |

* cited by examiner

Primary Examiner—Leo P. Picard
Assistant Examiner—Tung Minh Bui
(74) Attorney, Agent, or Firm—Coudert Brothers (57) ABSTRACT

A removable, EMI-shielding hard disk drive module for a notebook computer is pivotally insertable into the computer through an opening in the computer's base plate. Connectors fixedly mounted on the module and computer, respectively, mate when the module is fully inserted. A pin on the module cooperates with a movable cam on the computer to automatically lock the module in position when it is fully inserted, and to positively but smoothly disengage the connectors when the lock is released for removal of the module. To facilitate removal, the cam may lightly hold the module, after the connectors are disengaged, in a position where the module is easy to grasp and remove.

17 Claims, 6 Drawing Sheets

RELEASABLE DISK DRIVE FOR ELECTRONIC DEVICES

BACKGROUND OF THE INVENTION

1. Field of the Invention

This invention relates to hard drives for notebook computers, and more particularly to a drive module and releasable self-locking latch mechanism which permits easy and secure insertion and removal of a hard drive with a minimal risk of damage to the drive or computer.

2. Description of the Prior Art

One of the components most critical to the performance of a notebook personal computer (PC) is the hard disk drive. As one of the most utilized and fragile mechanical components on a notebook PC, the hard disk drive is one of the most frequently serviced, as well. The ability to easily remove and replace the hard disk drive enhances the serviceability of a notebook PC. For example, a readily removable hard drive would allow a company to issue each employee a personal hard drive and share fewer notebooks within the organization.

Prior techniques for installing a notebook hard drive include mounting the hard drive to a rigid plate with screws. This assembly is then mounted behind a panel on the exterior of the notebook and affixed with additional screws. A separate cable assembly is used to connect the drive to the notebook electronics. Shortcomings of this approach include a difficult installation/removal process requiring a screwdriver and several small screws which can easily be lost by the user. If any of these screws are lost, the hard drive may not be securely installed, which can contribute to early drive failure. Also, the proper alignment and engagement of the interconnection cable is difficult to perform and can contribute to apparent drive failure.

Another installation approach is to package the hard drive in an enclosure which also serves to properly mount and connect the interconnection cable. This assembly is inserted into an opening in the notebook with the cable connector leading until it engages its mating connector on the notebook electronics. An openable/removable door on the notebook exterior conceals the drive assembly. To remove the drive assembly, a small pull tab or handle is incorporated in the drive assembly on the end opposite the cable connector. The small size of the pull handle, which must be contained behind the door on the notebook exterior, makes it difficult for users with large or weak fingers to grasp the handle. Additionally, since there are many separate electrical signals which must be relayed through the hard drive assembly connector and the notebook, the hard drive connector has many pins and requires significant force to engage or disengage it from the notebook connector. Thus, when the user pulls on the drive assembly handle to remove the hard drive assembly, the connector often releases suddenly and in an uncontrolled manner, posing greater risk to the hard drive.

SUMMARY OF THE INVENTION

The present invention overcomes the deficiencies of the prior art by providing a drive module with a flanged chassis that carries the hard drive and the hard drive connector. The chassis includes a flange which engages the computer and aligns the chassis with respect to the computer. The module is pivotable about the flange and has a pin which engages a latch on the computer when the hard drive is fully inserted. The latch has a cam with an innovative shape which engages the pin so that when the latch is opened, the connectors are first gently but positively disengaged, and the module is then held by gravity and/or by a detent in a static, extended position from which it can be conveniently grasped and removed. When the drive module is fully removed from the computer, the latch returns to a static position which aligns it to receive the pin during a subsequent reinsertion of the drive module.

In a second embodiment of the invention, a possible deleterious torque about the axis of the pin due to uneven disengagement friction of the connectors is avoided by using two pins positioned side by side and arranged to engage a latch with two substantially identical side-by-side cam configurations.

DESCRIPTION OF THE PREFERRED EMBODIMENTS

Figure 1:
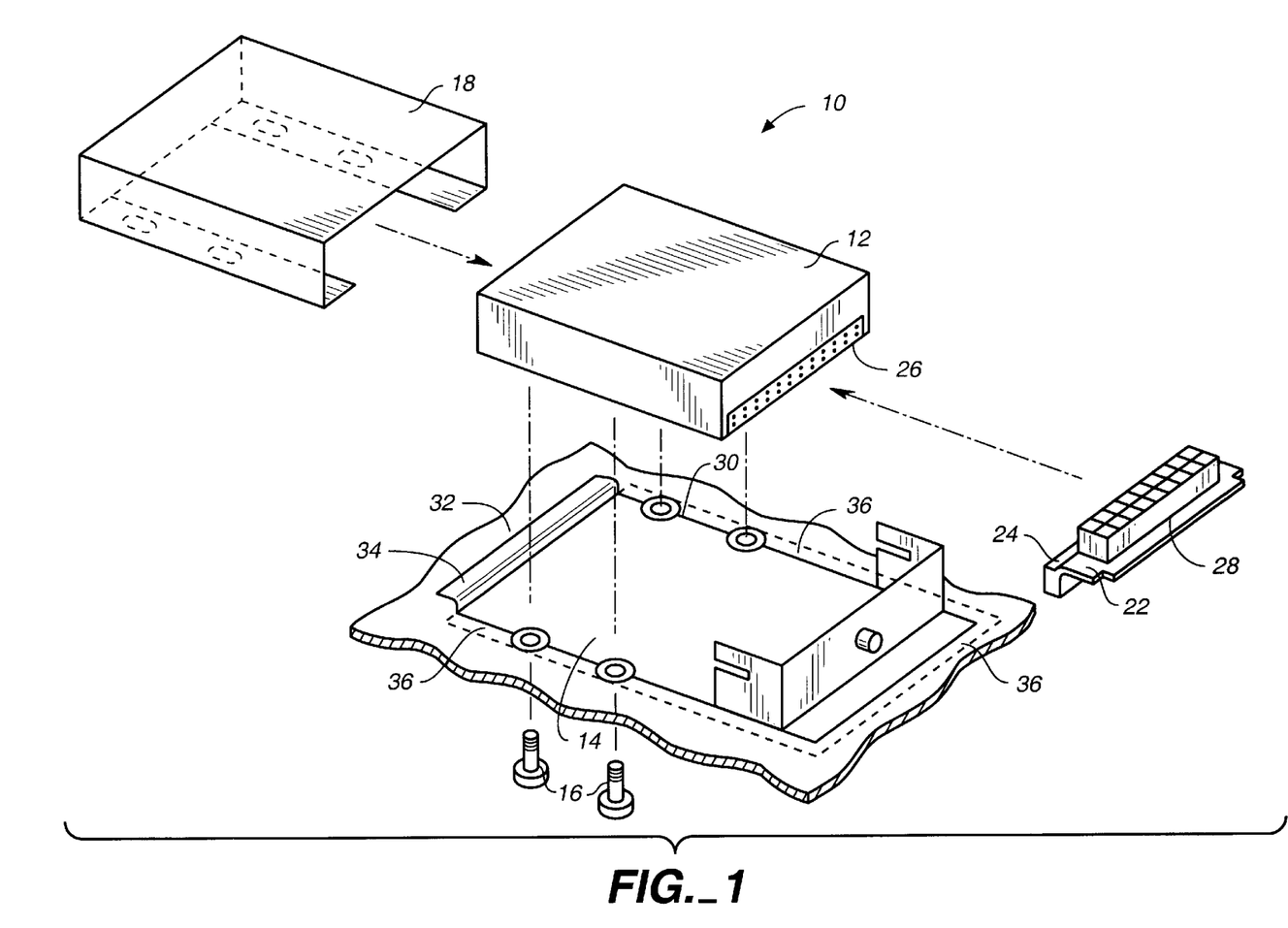
FIG. 1 is an exploded perspective view of the drive module of the present invention.

FIG. 1 shows the drive module 10 of the present invention in exploded form. A hard drive 12 is mounted on a chassis 14 by shock mount hardware 16 to protect the hard drive 12 during handling. A metal enclosure 18 surrounds the drive 12 and shields it from stray electromagnetic interference (EMI). A flexible relay cable assembly 22 carries a horizontally extending relay connector 24 that plugs into the connector 26 of the hard drive 12, and a vertically extending notebook connector 28 which plugs into a mating connector 64 (FIGS. 5–10) mounted in the body of the notebook computer 38 (FIGS. 2 and 3).

The module 10 is inserted into the underside of the notebook computer 38 through an opening 30 in the base plate 32 of the computer. A retaining flange 34 engages the inside of the base plate 32 outwardly of the opening 30, while the perimeter portions or side flanges 36 of the chassis 14 lie against the outside of the base plate 32 when the module 10 is fully inserted.

Figure 2:
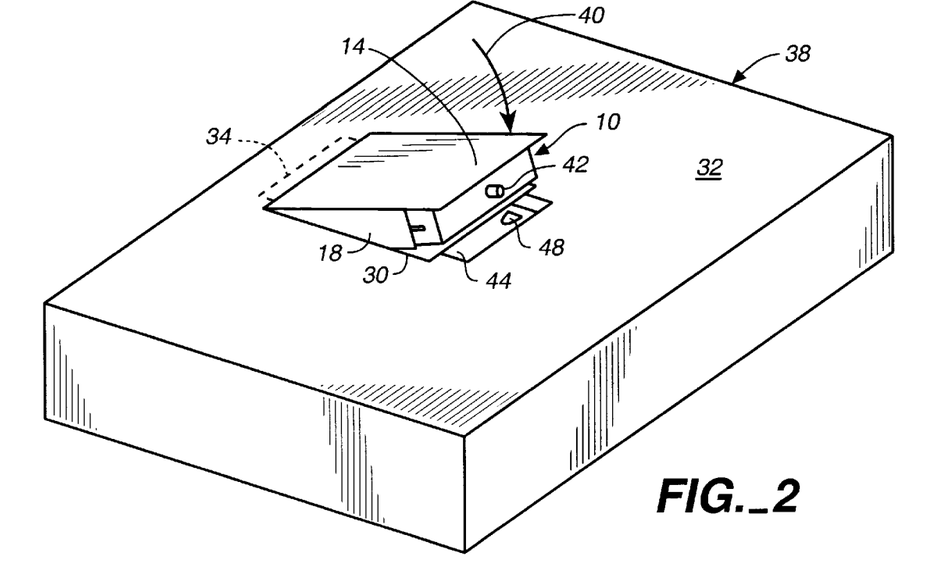
FIG. 2 is a perspective view of a notebook computer with the inventive drive module partly installed.
Figure 3:
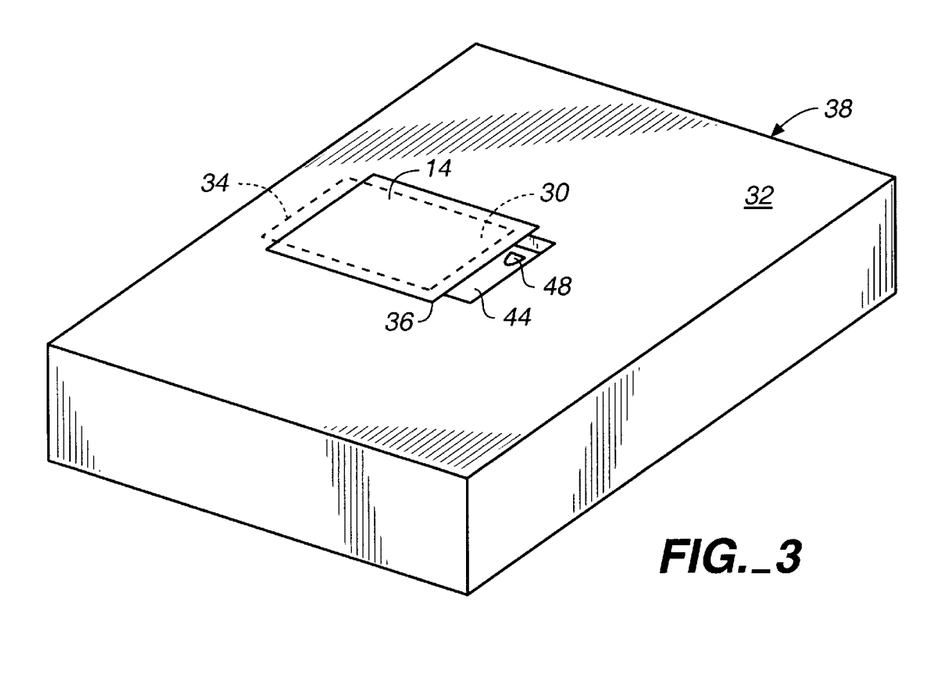
FIG. 3 is a perspective view of a notebook computer with the inventive drive module fully installed.

FIGS. 2 and 3 illustrate the process of inserting the inventive module 10. In these figures, the computer 38 is shown upside down as it would be for the installation of the module 10. As shown in FIG. 2, the retaining flange 34 is first inserted through the opening 30 with the module 10 positioned at an angle to the base plate 32. Then, the module 10 is rotated in the direction of the arrow 40 until the latch assembly 44 and the chassis 14 lies flat against the base plate 32 (FIG. 3).

Figure 4A:
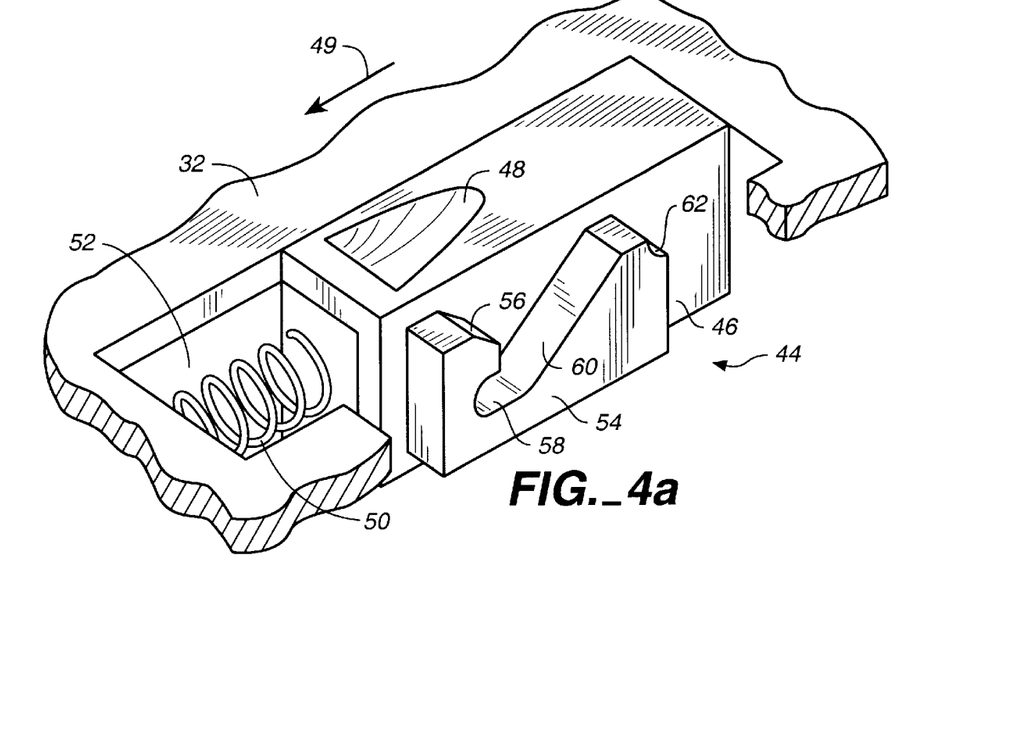
FIG. 4a is a perspective view of the latch assembly which is part of the present invention.
Figure 4B:
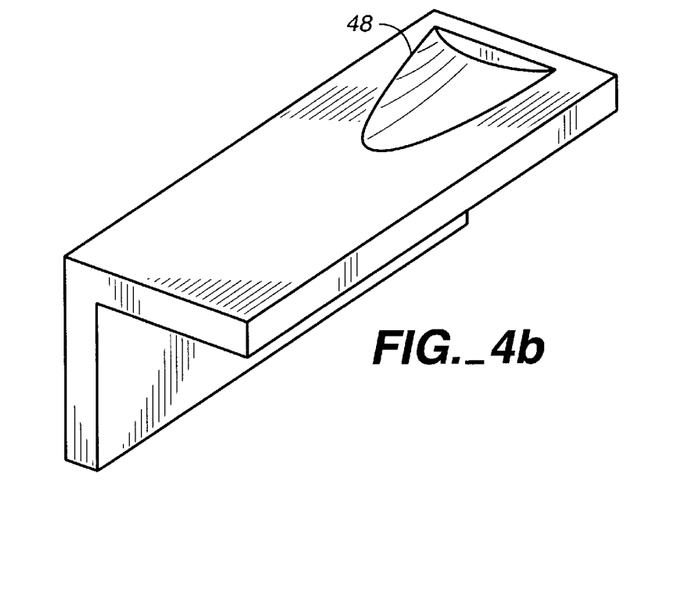
FIG. 4b is an opposite view of the finger recess feature of the latch assembly.

The details of the latch assembly 44 and its operation are shown in FIGS. 4a–10. FIG. 4a is a perspective view of the latch assembly 44 as seen from the hard drive. The latch assembly 44 includes a bracket 46 with a finger recess 48 (shown in opposite view in FIG. 4b) that can be pushed in the direction of arrow 49, against the bias of a spring 50, in a slot 52 formed in the base plate 32.

The bracket 46 carries on its side a latching cam 54 which is positioned to engage the pin 42 (FIG. 2) of the drive module 10 when the drive module 10 is inserted into the computer 38. The latching cam 54 has a lead-in ramp 56, a latching bay 58, a disengaging ramp 60, and a holding detent 62.

The action of the latching assembly 44 is illustrated in FIGS. 5–9. In these figures, the connector 28 on the drive module 10 and the fixed connector 64 mounted on the notebook computer 38 are shown symbolically in their relative vertical positions to illustrate their engagement and disengagement, although they would not actually be seen in the sections of FIGS. 5–9. Likewise, the flange 36 on the pin end of the drive module 10 and the base plate 32 of the computer are shown symbolically in their relative positions.

Figure 5:
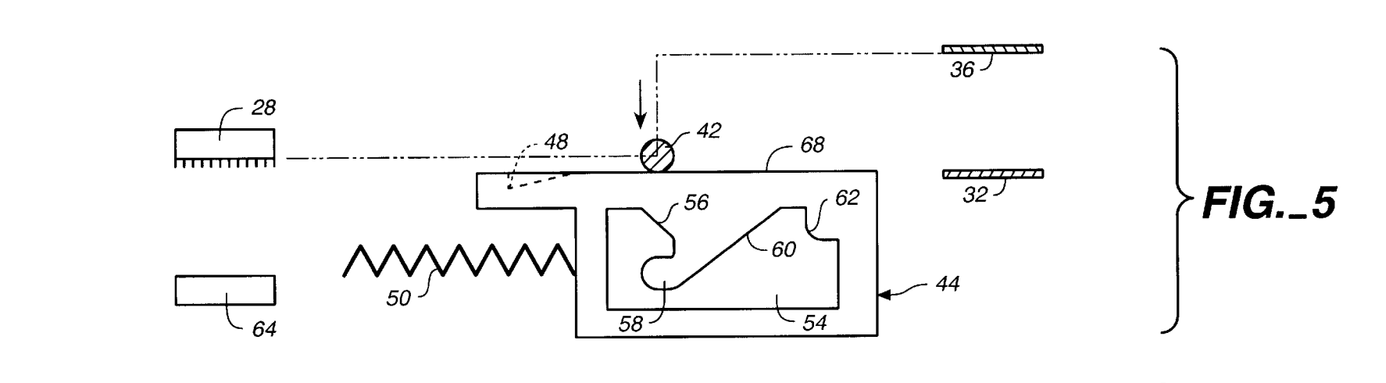
FIG. 5 is a front elevation view of the latch and pin prior to insertion of the inventive drive module.

FIG. 5 shows the pin 42 prior to insertion, with the drive module 10 essentially in the position of FIG. 2. The latch assembly 44 in FIG. 5 is in its rightmost position, into which it is urged by the spring 50. The connectors 28 and 64 are in vertical alignment with each other but are widely separated.

Figure 6:
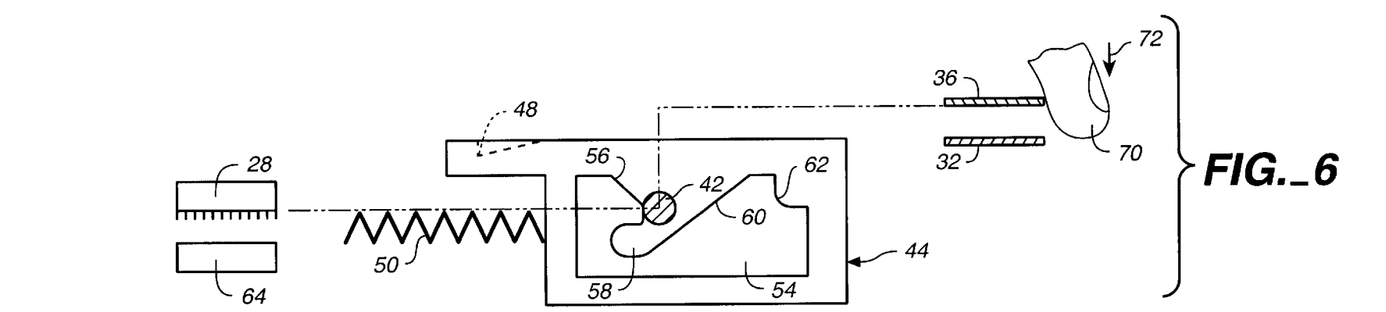
FIG. 6 is a front elevation view of the latch and pin during insertion of the drive module.

In FIG. 6, insertion pressure by a finger 70 on the pin end of the drive module 10 (arrow 72) has caused the pin 42 to engage the lead-in ramp 56 and has pushed the latch assembly 44 somewhat to the left against the bias of spring 50. The connectors 28 and 64 are still apart but are approaching each other.

Figure 7:
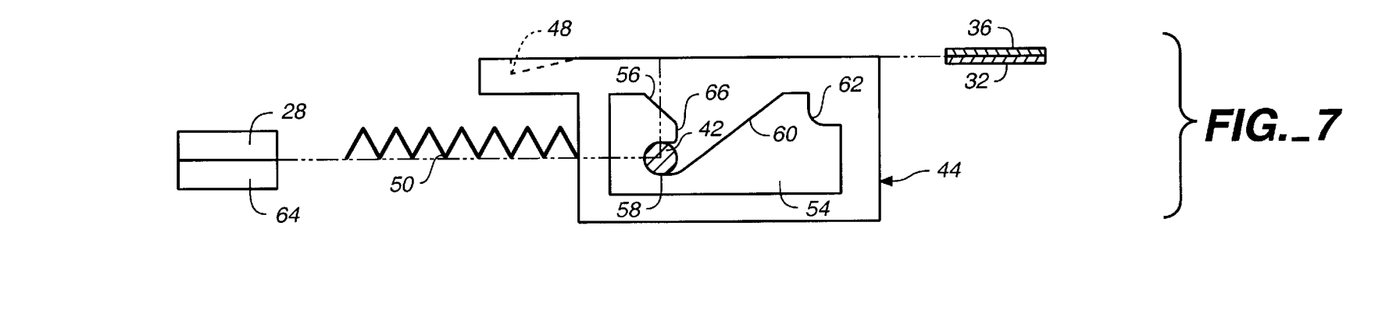
FIG. 7 is a front elevation view of the latch and pin with the drive module fully inserted and latched.

In FIG. 7, the drive module 10 has been inserted all the way. The pin 42 has cleared the vertical face 66 of the cam 54, and the spring 50 has pulled the latch assembly 44 back into its rightmost position where the latching bay 58 traps the pin 42 and locks the drive module 10 against disengagement. At this point, the connectors 28 and 64 are fully mated, and the flange 36 lies against the base plate 32.

Figure 8:
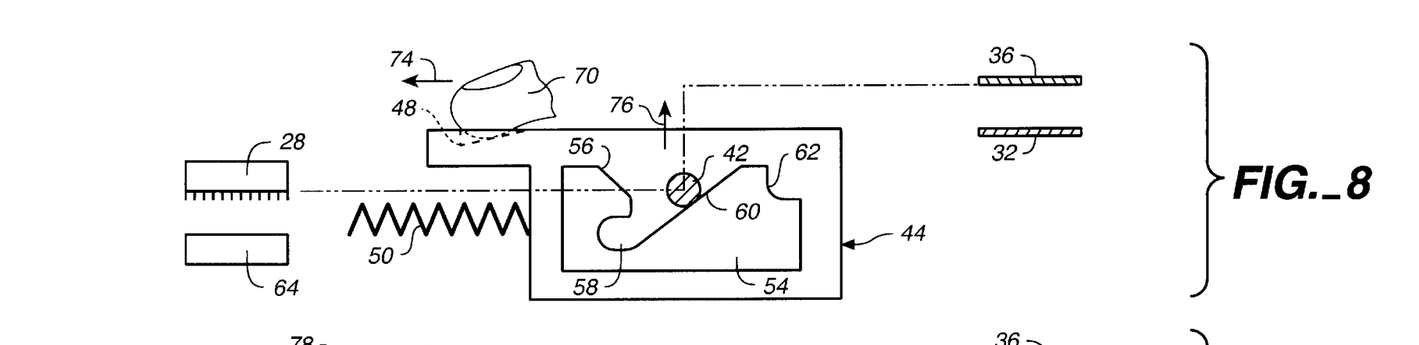
FIG. 8 is a front elevation view of the latch and pin during the disengagement of the drive module.
Figure 9:
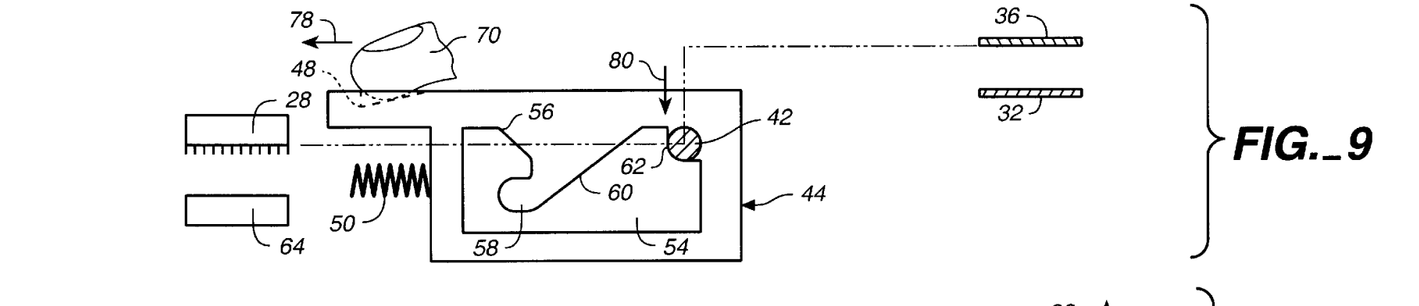
FIG. 9 is a front elevation view of the latch and pin in the disengaged position, with the drive module held ready for removal.
Figure 10:
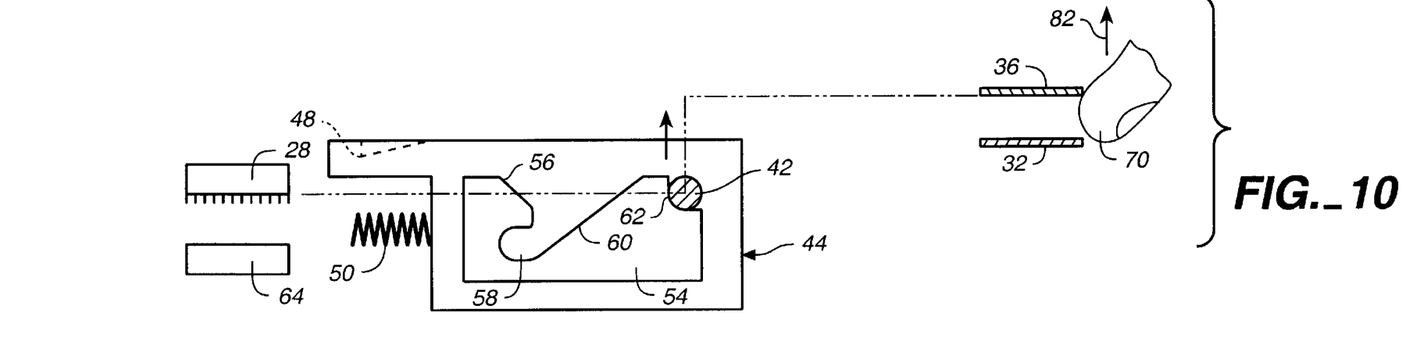
FIG. 10 is an elevation view illustrating the removal movement of the latch and pin.

When it is desired to remove the drive module 10 from the computer 38, the finger recess 48 can be used to push the latch assembly 44 to the left in FIG. 8 (arrow 74). As this is done, the disengagement ramp 60 raises the pin 42 (arrow 76) and pulls the connectors 28, 64 apart. The slope of the ramp 60 provides a mechanical advantage that positively and smoothly separates the connectors 28, 64 even if they have a tendency to stick together.

With the latch assembly pushed all the way to the left (FIG. 9, arrow 78), the weight of the drive module 10 causes the pin 42 to fall into the holding detent 62 (arrow 80). When the assembly 44 is released, the action of spring 50 biases the cam 54 against the pin 42. Thus, the holding surface 62 may be shaped to function as a detent and retain the pin 42 (and therefore the drive module 10) in a position in which the connectors 28, 64 are fully disengaged, and the drive module 10 can be lifted out by grasping the side flanges 36 FIG. 10 (arrow 82) and rotating the drive module 10 about the retaining flange 34 (FIGS. 1–3).

The shape of the holding detent 62 is preferably such that the pin 42 is held against accidental movement but is free enough to avoid significantly impeding the lifting and removal of drive module 10. When the drive module 10 is lifted to the point where pin 42 clears the horizontal surface 68 (FIG. 5), the spring 50 slides the latch assembly rightwardly back into the starting position of FIG. 5.

Figure 11:
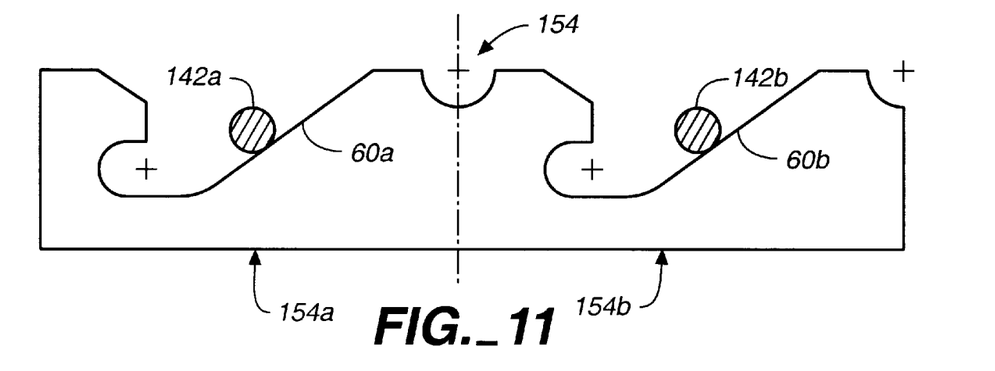
FIG. 11 is an elevation view of an alternative embodiment of the latch for use with a pair of pins.

FIG. 11 illustrates a variation of the cam 54 which solves a possible problem with the disengagement of the connectors 28 and 64. It has been found that in some instances, the connectors 28 and 64 do not disengage evenly throughout their length. This can produce a torque about the axis of pin 42 during disengagement that can damage the connectors or cause them to seize.

To avoid this problem, the cam 154 of FIG. 11 has two substantially identical side-by-side halves 154a and 154b, each of which cooperates as described above with one of two identical side-by-side pins 142a and 142b. In FIG. 11, the pins 142a and 142b are shown during their raising by the disengagement ramps 60a, 60b as illustrated in FIG. 8. It will be noted that with the cam of FIG. 11, the pins 142a and 142b can only move together, and that any rotational or twisting moment about the pin axis due to sticking of the connectors 28 and 64 is thereby prevented.

It is understood that the exemplary releasable hard drive mechanisms for notebook computers described herein and shown in the drawings represent only presently preferred embodiments of the invention. Indeed, various modifications and additions may be made to such embodiments without departing from the spirit and scope of the invention. Thus, other modifications and additions may be obvious to those skilled in the art and may be implemented to adapt the present invention for use in a variety of different applications.

What is claimed is:

1. An apparatus for easily and securely inserting a disk drive into, and removing it from, an electronic device, comprising:

a) a drive module adapted to fixedly receive a disk drive, said drive module being insertable into said electronic device and fixedly carrying thereon a pin extending therefrom in a direction substantially perpendicular to the direction of insertion;

b) a releasable latching mechanism including a latching cam mounted on said electronic device for resilient movement in a direction substantially perpendicular to both said insertion direction and said pin, said latching cam being positioned to engage said pin during insertion of said drive module into said electronic device;

c) said latching cam being arranged to capture and lock said pin when said drive module is fully inserted, to push said pin in a direction to remove said drive module from said electronic device when said latching cam is moved, and to support said drive module in a partly removed position with further movement of said latching cam.

2. The apparatus of claim 1, in which said drive module and electronic device each carry a connector, said connectors being positioned so as to be mated by insertion of said drive module into said electronic device.

3. The apparatus of claim 1, in which said latching cam includes:

i) a lead-in ramp arranged to be engaged by said pin during insertion of said drive module so as to move said latching cam from a first position to a second position;

ii) a latching bay formed to receive said pin upon completion of said insertion and to lock it against removal by allowing said latching cam to be biased into said first position;

iii) a disengaging ramp formed so as to release said pin and push it toward partial removal of said drive module when said latching cam is moved from said first position to a third position; and iv) a holding detent formed to receive said pin and lightly hold it when said latching cam is in said third position.

4. The apparatus of claim 1, in which said latching cam is shaped to permit a connector of said drive module to be easily and securely coupled to a connector of said electronic device when said drive module is inserted into said electronic device, and permits said drive module to be easily and securely uncoupled from said connector of said electronic device when said drive module is removed from said electronic device.

5. The apparatus of claim 1, in which said electronic device is a computer, and said disk drive is a hard disk drive.

6. An apparatus for easily and securely inserting a disk drive into, and removing it from, an electronic device, in which said electronic device has a base plate with an opening formed therein, comprising:

a) a drive module adapted to fixedly receive a disk drive, said drive module being insertable into said electronic device and fixedly carrying thereon a pin extending therefrom in a direction substantially perpendicular to the direction of insertion, said drive module having a retaining flange adapted to engage said base plate, and being insertable into said electronic device by pivoting it about said retaining flange while said retaining flange is engaged with said base plate;

b) a releasable latching mechanism including a latching cam mounted on said electronic device for resilient movement in a direction substantially perpendicular to both said insertion direction and said pin, said latching cam being positioned to engage said pin during insertion of said drive module into said electronic device;

c) said latching cam being arranged to capture and lock said pin when said drive module is fully inserted, to push said pin in a direction to remove said drive module from said electronic device when said latching cam is moved, and to support said drive module in a partly removed position with further movement of said latching cam.

7. The apparatus of claim 6, in which said electronic device is a computer, and said disk drive is a hard disk drive.

8. The apparatus of claim 6, in which said drive module and electronic device each carry a connector, said connectors being positioned so as to be mated by insertion of said drive module into said electronic device.

9. The apparatus of claim 6, in which said latching cam includes:

i) a lead-in ramp arranged to be engaged by said pin during insertion of said drive module so as to move said latching cam from a first position to a second position;

ii) a latching bay formed to receive said pin upon completion of said insertion and to lock it against removal by allowing said latching cam to be biased into said first position;

iii) a disengaging ramp formed so as to release said pin and push it toward partial removal of said drive module when said latching cam is moved from said first position to a third position; and iv) a holding detent formed to receive said pin and lightly hold it when said latching cam is in said third position.

10. An apparatus for easily and securely inserting a disk drive into, and removing it from, an electronic device, comprising:

a) a drive module adapted to fixedly receive a disk drive, said drive module being insertable into said electronic device; said drive module carrying a pair of pins extending parallel to each other, said pins being spaced from each other in a direction perpendicular to both the axes of said pins and said direction of insertion;

b) a releasable latching mechanism including a latching cam mounted on said electronic device for resilient movement in a direction substantially perpendicular to both said insertion direction and said pins, said latching cam having two substantially identical portions arranged side by side in the direction in which said pins are spaced, each of said portions being substantially identically engaged by one of said pins during insertion and removal of said drive module;

c) said latching cam being arranged to capture and lock said pins when said drive module is fully inserted, to push said pins in a direction to remove said drive module from said electronic device when said latching cam is moved, and to support said drive module in a partly removed position with further movement of said latching cam, each of said identical portions of said latching cam further comprising:

i) a lead-in ramp arranged to be engaged by one of said pins during insertion of said drive module so as to move said latching cam from a first position to a second position;

ii) a latching bay formed to receive one of said pins upon completion of said insertion and to lock it against removal by allowing said latching cam to be biased into said first position;

iii) a disengaging ramp formed so as to release one of said pins and push it toward partial removal of said drive module when said latching cam is moved from said first position to a third position; and iv) a holding detent formed to receive one of said pins and lightly hold it when said latching cam is in said third position.

11. The apparatus of claim 10, in which said electronic device is a computer, and said disk drive is a hard disk drive.

12. An apparatus for easily and securely inserting a disk drive into, and removing it from, an electronic device, comprising:

a) a drive module adapted to fixedly receive a disk drive, said electronic device having a base plate with an opening formed therein to receive said drive module, said drive module being insertable into said electronic device and fixedly carrying thereon a pin extending therefrom in a direction substantially perpendicular to the direction of insertion, and said drive module further includes:

i) a chassis arranged to fixedly support a disk drive;

ii) an enclosure attachable to said chassis to enclose said disk drive; and iii) a connector fixedly mounted on said drive module for engagement with a connector fixedly mounted on said electronic device;

iv) said chassis having a retaining flange positioned to engage the inside of said base plate upon insertion of said drive module through said opening; and v) said chassis having at least one side flange arranged to engage the outside of said base plate when said drive module is fully inserted;

b) a releasable latching mechanism including a latching cam mounted on said electronic device for resilient movement in a direction substantially perpendicular to both said insertion direction and said pin, said latching cam being positioned to engage said pin during insertion of said drive module into said electronic device;

c) said latching cam being arranged to capture and lock said pin when said drive module is fully inserted, to push said pin in a direction to remove said drive module from said electronic device when said latching cam is moved, and to support said drive module in a partly removed position with further movement of said latching cam.

13. The apparatus of claim 12, in which said enclosure is an EMI shield.

14. The apparatus of claim 12, in which said disk drive is supported on said chassis by a shock mount.

15. The apparatus of claim 12, in which said electronic device is a computer, and said disk drive is a hard disk drive.

16. A latching mechanism connected to an electronic apparatus, for enabling engagement with an engaging portion of a disk drive detachably mounted to said electronic apparatus; comprising;

a first receiving portion engaging with said engaging portion in a case where said disk drive is inserted in said electronic apparatus and locking said disk drive in said electronic apparatus;

a second receiving portion engaging with said engaging portion in said case where said disk drive is released from said electronic apparatus, and supporting said disk drive in a position such that a part of said disk drive projects from said electronic apparatus;

a movement portion, connected to said first and second receiving portions, being movable so that said first and second receiving portions can engage with said engaging portion of said disk drive.

17. The latching mechanism of claim 16, in which said electronic apparatus is a computer, and said disk drive is a hard disk drive.

* * * * *